US007680323B1

(12) United States Patent
Nichani

(10) Patent No.: US 7,680,323 B1
(45) Date of Patent: Mar. 16, 2010

(54) METHOD AND APPARATUS FOR THREE-DIMENSIONAL OBJECT SEGMENTATION

(75) Inventor: Sanjay Nichani, Natick, MA (US)

(73) Assignee: Cognex Corporation, Natick, MA (US)

( * ) Notice: Subject to any disclaimer, the term of this patent is extended or adjusted under 35 U.S.C. 154(b) by 1361 days.

(21) Appl. No.: 10/720,801

(22) Filed: Nov. 24, 2003

Related U.S. Application Data

(62) Division of application No. 09/563,013, filed on Apr. 29, 2000, now Pat. No. 6,701,005.

(51) Int. Cl.
*G06K 9/62* (2006.01)

(52) U.S. Cl. ...................................... 382/154; 345/419

(58) Field of Classification Search ................. 382/154, 382/190, 192, 193, 195, 199, 201, 203, 206, 382/291; 345/419, 420, 421, 422, 423, 424, 345/426, 427; 356/12; 348/94, 95
See application file for complete search history.

(56) References Cited

U.S. PATENT DOCUMENTS 3,686,434 A 8/1972 Lemelson
3,727,034 A 4/1973 Pope
3,779,178 A 12/1973 Riseley, Jr.
3,816,648 A 6/1974 Noll et al.
3,858,043 A 12/1974 Sick et al.
4,000,400 A 12/1976 Elder
4,198,653 A 4/1980 Kamin
4,303,851 A 12/1981 Mottier
4,382,255 A 5/1983 Pretini
4,458,266 A 7/1984 Mahoney
4,799,243 A 1/1989 Zepke
4,847,485 A 7/1989 Koelsch
4,970,653 A 11/1990 Kenue
4,998,209 A 3/1991 Vuichard et al.
5,075,864 A 12/1991 Sakai
5,097,454 A 3/1992 Schwarz et al.
5,201,906 A 4/1993 Schwarz et al.
5,208,750 A 5/1993 Kurami et al.
5,245,422 A 9/1993 Borcherts et al.
5,301,115 A 4/1994 Nouso
5,387,768 A 2/1995 Tzard et al.
5,432,712 A 7/1995 Chan (Continued)

FOREIGN PATENT DOCUMENTS

EP 0847030 6/1998

(Continued)

OTHER PUBLICATIONS

Dhond et al., Structure from Stereo, A Review, 1989, IEEE, pp. 1489-1509.*

(Continued)

*Primary Examiner*—John B Strege

(57) ABSTRACT

A three-dimensional (3-D) machine-vision involving a method and apparatus for performing segmentation of 3-D objects. Multiple stereo-related sets (left/right, top/left, top/right) of two-dimensional video pixel data are separately processed into sets of edges. Each stereo-related set is then pair-wise processed to convert pairs of sets of edge data into 3-D point data. Multiple sets of pair-wise 3-D data are then merged and used for obtaining 3-D features which are then clustered into discrete 3-D objects that can lie on any arbitrary plane.

13 Claims, 3 Drawing Sheets

U.S. PATENT DOCUMENTS

| | | | |
|---|---|---|---|
| 5,519,784 | A | 5/1996 | Vermeulen |
| 5,528,703 | A | 6/1996 | Lee |
| 5,529,138 | A | 6/1996 | Shaw et al. |
| 5,555,312 | A | 9/1996 | Shima et al. |
| 5,559,551 | A | 9/1996 | Sakamoto et al. |
| 5,565,918 | A | 10/1996 | Homma et al. |
| 5,577,130 | A | 11/1996 | Wu |
| 5,579,444 | A | 11/1996 | Dalziel et al. |
| 5,581,250 | A | 12/1996 | Khvilivitzky |
| 5,581,625 | A | 12/1996 | Connell et al. |
| 5,589,928 | A | 12/1996 | Babbitt et al. |
| 5,642,106 | A | 6/1997 | Hancock et al. |
| 5,706,355 | A | 1/1998 | Raboisson et al. |
| 5,734,336 | A | 3/1998 | Smithline |
| 5,832,134 | A | 11/1998 | Avinash |
| 5,866,887 | A | 2/1999 | Hashimoto et al. |
| 5,870,220 | A | 2/1999 | Migdal et al. |
| 5,880,782 | A | 3/1999 | Koyanagi et al. |
| 5,917,936 | A | 6/1999 | Katto |
| 5,917,937 | A | 6/1999 | Szeliski et al. |
| 5,961,571 | A | 10/1999 | Gorr et al. |
| 5,974,192 | A | 10/1999 | Kundu |
| 5,995,649 | A | 11/1999 | Marugame |
| 6,028,626 | A | 2/2000 | Aviv et al. |
| 6,081,619 | A | 6/2000 | Hashimoto et al. |
| 6,173,070 | B1 | 1/2001 | Michael et al. |
| 6,195,102 | B1 | 2/2001 | McNeil et al. |
| 6,205,233 | B1 | 3/2001 | Morley et al. |
| 6,205,242 | B1 | 3/2001 | Onoguchi et al. |
| 6,215,898 | B1 | 4/2001 | Woodfill et al. |
| 6,226,396 | B1 | 5/2001 | Marugame |
| 6,295,367 | B1 | 9/2001 | Crabtree et al. |
| 6,301,440 | B1 | 10/2001 | Bolle et al. |
| 6,307,951 | B1 | 10/2001 | Tanigawa et al. |
| 6,308,644 | B1 | 10/2001 | Diaz |
| 6,345,105 | B1 | 2/2002 | Nitta et al. |
| 6,408,109 | B1 | 6/2002 | Silver et al. |
| 6,469,734 | B1 | 10/2002 | Nichani et al. |
| 6,496,204 | B1 | 12/2002 | Nakamura |
| 6,496,220 | B2 | 12/2002 | Landert et al. |
| 6,678,394 | B1 | 1/2004 | Nichani |
| 6,690,354 | B2 | 2/2004 | Sze |
| 6,701,005 | B1 | 3/2004 | Nichani |
| 6,710,770 | B2 | 3/2004 | Tomasi et al. |
| 6,720,874 | B2 | 4/2004 | Fufido et al. |
| 6,756,910 | B2 | 6/2004 | Ohba et al. |
| 6,791,461 | B2 | 9/2004 | Oku et al. |
| 6,919,549 | B2 | 7/2005 | Bamji et al. |
| 6,940,545 | B1 | 9/2005 | Ray et al. |
| 6,963,661 | B1 | 11/2005 | Hattori et al. |
| 6,999,600 | B2 | 2/2006 | Venetianer et al. |
| 7,003,136 | B1 | 2/2006 | Harville |
| 7,058,204 | B2 | 6/2006 | Hildreth et al. |
| 7,088,236 | B2 | 8/2006 | Sorensen |
| 7,146,028 | B2 | 12/2006 | Lestideau |
| 7,260,241 | B2 | 8/2007 | Fukuhara et al. |
| 7,382,895 | B2 | 6/2008 | Bramblet et al. |
| 7,471,846 | B2 | 12/2008 | Steinberg et al. |
| 2001/0010731 | A1 | 8/2001 | Miyatake et al. |
| 2001/0030689 | A1 | 10/2001 | Spinelli |
| 2002/0039135 | A1 | 4/2002 | Heyden |
| 2002/0041698 | A1 | 4/2002 | Ito et al. |
| 2002/0113862 | A1 | 8/2002 | Center, et al. |
| 2002/0118113 | A1 | 8/2002 | Oku et al. |
| 2002/0118114 | A1 | 8/2002 | Ohba et al. |
| 2002/0135483 | A1 | 9/2002 | Merheim et al. |
| 2002/0191819 | A1 | 12/2002 | Hashimoto et al. |
| 2003/0053660 | A1 | 3/2003 | Heyden |
| 2003/0071199 | A1 | 4/2003 | Esping et al. |
| 2003/0164892 | A1 | 9/2003 | Shiraishi et al. |
| 2004/0017929 | A1 | 1/2004 | Bramblet et al. |
| 2004/0045339 | A1 | 3/2004 | Nichani et al. |
| 2004/0061781 | A1 | 4/2004 | Fennell et al. |
| 2004/0153671 | A1 | 8/2004 | Schuyler et al. |
| 2004/0218784 | A1 | 11/2004 | Nichani et al. |
| 2005/0074140 | A1 | 4/2005 | Grasso et al. |
| 2005/0105765 | A1 | 5/2005 | Han et al. |

FOREIGN PATENT DOCUMENTS

| | | |
|---|---|---|
| EP | 0706062 | 5/2001 |
| EP | 0817123 | 9/2001 |
| WO | 9631047 | 3/1996 |
| WO | 96388820 | 12/1996 |
| WO | 9808208 | 7/1998 |
| WO | 0175809 | 10/2001 |
| WO | 0248971 | 6/2002 |
| WO | 02095692 | 11/2002 |

OTHER PUBLICATIONS

Umesh R. Dhond et al., IEEE Transactions on Pattern Analysis and Machine Intelligence, Stereo Matching in the Presence of Narrow Occluding Objects Using Dynamic Disparity Search, vol. 17, No. 7, Jul. 1995, one page.

Scientific Technologies Inc., Theory of Operation and Terminology, p. A50-A54, 2001.

Scientific Technologies Inc., Safety Strategy, pp. A24-A30, 2001.

Scientific Technologies Inc., Safety Standards for Light Curtains, pp. A14-A15.

Web document, PLS Proximity Laser Canner Applications, website: wwwsickoptic.com/safapp.htrn, picked as of Nov. 4, 1999, 3 pages.

Web document, New Dimensions in Safeguarding, website: www.sickoptic,com/pIsscan.htm, picked as of Nov. 3, 1999, 3 pages.

Web document, Special Features, website: www.sickoptic.com/msl.htm, picked as of Nov. 3, 1999, 3 pages.

Web document, Capacitive Proximity Sensors, website: www.theproductfinder.com/sensors/cappro.htm, picked Nov. 3, 1999, 1 page.

Web document, The Safety Light Curtain, website: www.theproductfinder.com/sensors/saflig.htm, picked as of Nov. 3, 1999, 1 page.

Web document, WV 601 TV/FM, website: www.leadtek.com/wv601.htm, picked as of Nov. 9, 1999, 3 pages.

Web document, Product Information, website: www.imagraph.com/products/IMAproducts-ie4.htm, picked as of Nov. 9, 1999, 1 page.

Web document, FlashPoint 128, website: www.integraltech.com/128OV.htm, picked as of Nov. 9, 1999, 2 pages.

Web document, Compatible Frame Grabber List, website: www.masdkodak.com/frmegrbr.htm, picked as of Nov. 9,1999, 6 pages.

Umesh R. Dhond et al., IEEE Transactions on System, Structure from Stereo - A Review, vol. 19, No. 6, Nov./Dec. 1989.

S.B. Pollard, et al., Perception, PMF, A Stereo Correspondence Algorithm Using a Disparity Gradient Limit, 14:449-470, 1985.

L. Vincent, et al., IEEE Transactions on Pattern Analysis and Machine Intelligence, Watersheds in Digital Spaces: An Efficient Algorithm Based on Immersion Simulations 13(6):583-598, 1991.

J.H. McClellan, et al., DSP First - A Multimedia Approach, Prentice Hall, Section 5: pp. 119 - 152 & Section 8: pp. 249-311.

R.C. Gonzalez, et al., Digital Image Processing - Second Edition, Chapter 7: pp. 331 - 388.

Burschka, et al., Scene Classification from Dense Disparity Mapis in Indoor Environments, Proceedings of ICPR 2002.

Canesta, Inc., Development Platform - DP200, Electronic Perception Technology - Real-time single chip 3D imaging, 11005-01 Rev 2, Jul. 12, 2004.

CEDES, News from the CEDES World , 2009.

CSEM SA, Swiss Ranger SR-2 Datasheet, CSEM Technologies for innovation, www.csem.ch, imaging@csem.ch, Bandenerstrasse 569, CH 8048, Zurich, Switzerland, 2004.

Gluckman, Joshua, et al, Planar Catadioptric Stereo: Geometry and Calibration, IEEE, 1999.

Gurovich, Alexander, et al, Automatic Door Control using Motion Recognition, Technion, Israel Institute of Technology, Aug. 1999.

Jain, et al, Machine Vision, Chapter 11-Depth, MIT Press and McGraw-Hill Inc. 1995, pp. 289-279.

Kalman, R. E., A New Approach to Linear Filtering and Prediction Problems, Transactions of the ASME, The Journal of Basic Engineering, 8, pp. 35-45, 1960.

Kanade, T., et al, A Stereo Machine for Video-rate Dense Depth Mapping and Its New Applications, Proc. IEEE Computer Vision and pattern Recognition, pp. 196-202, 1996.

Norris, Jeffery, Face Detection and Recognition in Office Environments, Department fo Electrical Engineering and Computer Science, Massachusetts Institute of Technology, May 21, 1999.

Pilz GmbH & Co., Safe camera system SafetyEye, http://www.pilz.com/products/sensors/camera/f/safetyeye/sub/application/index.en.jsp, 2007.

Pollard, Stephen P., et al, A Stereo Correspondence Algorithm using a disparity gradient limit, Perception, vol. 14, 1985.

Prati, A., et al, Detecting Moving Shadows: Algorithms and Evaluations, IEEE Transactions on Pattern Analysis and Machine Intelligence, vol. 25, No. 7, pp. 918-923, 2003.

Roeder-Johnson Corporation, Low-cost, Broadly-Available Computer/Machine Vision Applications Much Closer with New Canesta Development Platform, Press Release, San Jose, CA, Aug. 10, 2004.

Tsai, R. Y., A Versatile Camera Calibration Technique for High-Accuracy 3D Machine vision Metroloty using off-the-shelf TV Cameras and Lenses, IEEE J. Robotics and Automation, vol. 3, No. 4, Aug. 1989.

Weng, Agglomerative Clustering Algorithm, www.speech.sri.com, 1997.

Zhang, Z., A Flexible New Technique for Camera Calibration, Technical Report MSR-TR-98-71, Microsoft Research, Microsoft Corporation, pp.1-22, Mar. 25, 1996.

* cited by examiner

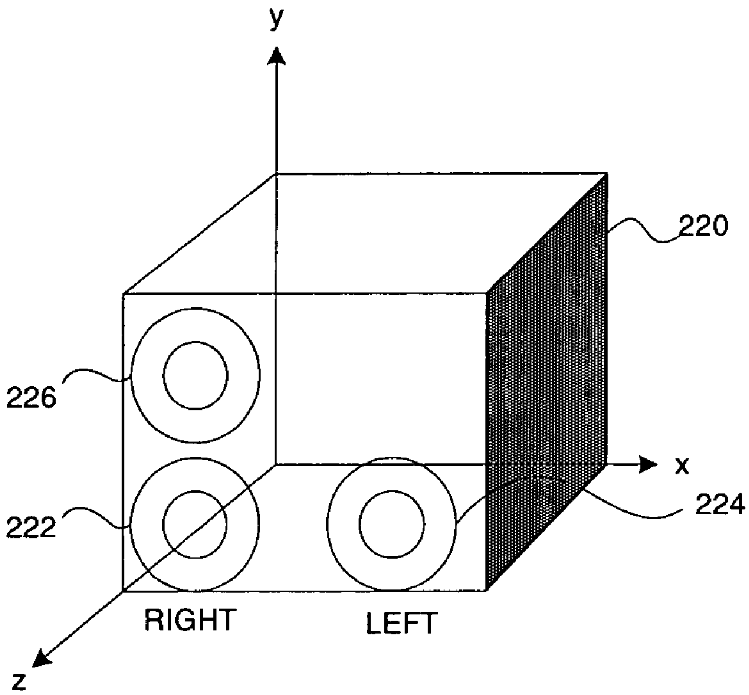
FIGURE 2
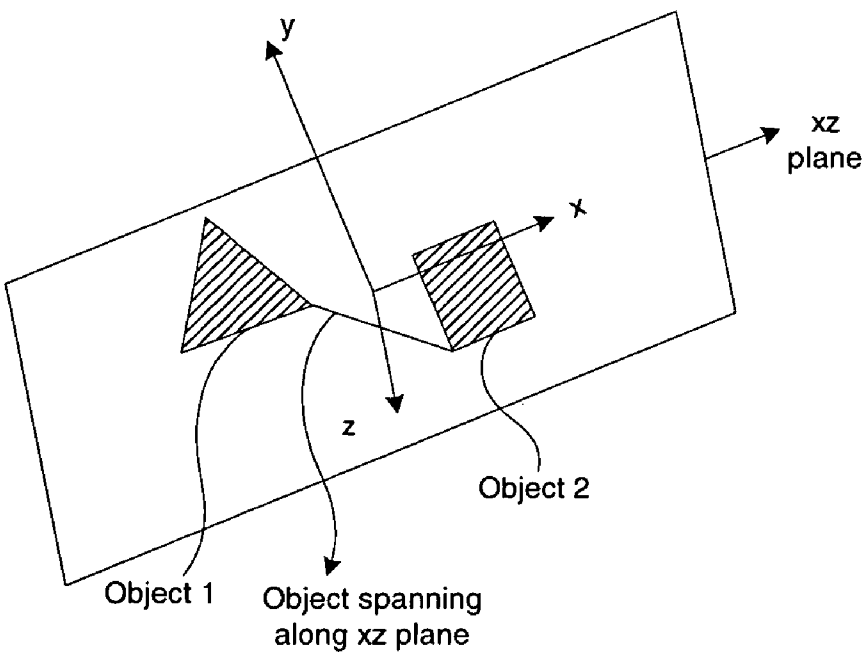

METHOD AND APPARATUS FOR THREE-DIMENSIONAL OBJECT SEGMENTATION

CROSS REFERENCE TO RELATED APPLICATIONS

This application is a division of U.S. patent application Ser. No. 09/563,013, filed Apr. 29, 2000 now U.S. Pat. No. 6,701,005.

FIELD OF THE INVENTION

The present invention relates to automated vision systems, and more particularly to a system for three-dimensional object segmentation.

BACKGROUND OF THE INVENTION

Passive techniques of steropsis involve triangulation of features viewed from different positions or at different times, under ambient lighting conditions, as described in "Structure From Stereo-A Review," Dhond, Umesh R, and Aggarwal, J. K., IEEE Transactions On Systems, Man, And Cybernetics, Vol. 19, No, 6, November/December 1989. The major steps in stereopsis are preprocessing, matching, and recovering depth information. As described in the reference, the process of matching features between multiple images is perhaps the most critical stage of stereopsis. This step is also called the correspondence problem.

It is also well known that stereo matching using edge segments, rather than individual points, provides increased immunity from the effects of isolated points, and provides an additional disambiguating constraint in matching segments of different stereoscopic images taken of the same scene. A variety of algorithms can be used for matching edge segments that meet criteria for 3-D segments occurring along a smooth surface. In addition, a trinocular camera arrangement provides further information that can improve a binocular depth map with points (or edges) matched if they satisfy additional geometric constraints, such as length and orientation.

Once the segmented points have been identified and the depth information recovered, the 3-D object structure can be obtained which can then be used in 3-D object recognition. The purpose of this embodiment is more to segment the 3-D scene into 3-D objects that are spatially separated in a 2-D plane, rather than object recognition. Therefore, an elaborate 3-D object re-construction is not necessary.

However, the prior combinations of feature detection, matching, 3-D segmentation are computationally intensive, either decreasing speed or increasing cost of automated systems. Furthermore, prior methods lack robustness because of susceptibility to noise and confusion among match candidates. 3-D data is mostly used for object recognition, as opposed to segmentation of objects placed in a plane in 3-D space. Known techniques, typically using 2D segmentation, assume a fixed relationship between the camera system and the plane under consideration, that is, they do not facilitate specifying any arbitrary plane.

SUMMARY OF THE INVENTION

The present invention provides a three-dimensional (3-D) machine-vision object-segmentation solution involving a method and apparatus for performing high-integrity, high efficiency machine vision. The machine vision segmentation solution converts stereo sets of two-dimensional video pixel data into 3-D point data that is then segmented into discrete objects, and subsequent characterization of a specific 3-D object, objects, or an area within view of a stereoscopic camera. Once the segmented points have been identified and the depth information recovered the 3-D object structure can be obtained which can then be used in 3-D object recognition.

According to the invention, the 3-D machine-vision segmentation solution includes an image acquisition device such as two or more video cameras, or digital cameras, arranged to view a target scene stereoscopically. The cameras pass the resulting multiple video output signals to a computer for further processing. The multiple video output signals are connected to the input of a video processor adapted to accept the video signals, such as a "frame grabber" sub-system. Video images from each camera are then synchronously sampled, captured, and stored in a memory associated with a data processor (e.g., a general purpose processor). The digitized image in the form of pixel information can then be accessed, archived, manipulated and otherwise processed in accordance with capabilities of the vision system. The digitized images are accessed from the memory and processed according to the invention, under control of a computer program. The results of the processing are then stored in the memory, or may be used to activate other processes and apparatus adapted for the purpose of taking further action, depending upon the application of the invention.

In further accord with the invention, the 3-D machine-vision segmentation solution method and apparatus includes a process and structure for converting a plurality of two-dimensional images into clusters of three-dimensional points and edges associated with boundaries of objects in the target scene. A set of two-dimensional images is captured, filtered, and processed for edge detection. The filtering and edge detection are performed separately for the image corresponding to each separate camera resulting in a plurality of sets of features and chains of edges (edgelets), characterized by location, size, and angle. The plurality is then sub-divided into stereoscopic pairs for further processing, i.e., Right/Left, and Top/Right.

The stereoscopic sets of features and chains are then pairwise processed according to the stereo correspondence problem, matching features from the right image to the left image, resulting in a set of horizontal disparities, and matching features from the right image to the top image, resulting in a set of vertical disparities. The robust matching process involves measuring the strength and orientation of edgelets, tempered by a smoothness constraint, and followed by an iterative uniqueness process.

Further according to the invention, the multiple (i.e., horizontal and vertical) sets of results are then merged (i.e., multiplexed) into a single consolidated output, according to the orientation of each identified feature and a pre-selected threshold value. Processing of the consolidated output then proceeds using factors such as the known camera geometry to determine a single set of 3-D points. The set of 3-D points is then further processed into a set of 3-D objects through a "clustering" algorithm which segments the data into distinct 3-D objects. The output can be quantified as either a 3-D location of the boundary points of each object within view, or segmented into distinct 3-D objects in the scene where each object contains a mutually exclusive subset of the 3-D boundary points output by the stereo algorithm.

Machine vision systems effecting processing according to the invention can provide, among other things, an automated capability for performing diverse inspection, location, measurement, alignment and scanning tasks. The present invention provides segmentation of objects placed in a plane in 3-D space. The criterion for segmentation into distinct objects is that the minimum distance between the objects along that plane (2D distance) exceed a preset spacing threshold. The potential applications involve segmenting images of vehicles in a road, machinery placed in a factory floor, or objects placed on a table. Features of the present invention include the ability to generate a wide variety of real-time 3-D information about 3-D objects in the viewed area. Using the system according to the invention, distance from one object to another can be calculated, and the distance of the objects from the camera can also be computed.

According to the present invention a high accuracy feature detector is implemented, using chain-based correspondence matching. The invention adopts a 3-camera approach and a novel method for merging disparities based on angle differences detected by the multiple cameras. Furthermore, a fast chain-based clustering method is used for segmentation of 3-D objects from 3-D point data on any arbitrary plane. The clustering method is also more robust (less susceptible to false images) because object shadows are ignored.

BRIEF DESCRIPTION OF THE DRAWINGS

These and other features of the present invention will be better understood in view of the following detailed description taken in conjunction with the drawings, in which:

FIG. 2 is an illustration of a trinocular camera arrangement adapted for use in acquiring images for processing according to the invention.

DETAILED DESCRIPTION

Figure 1:
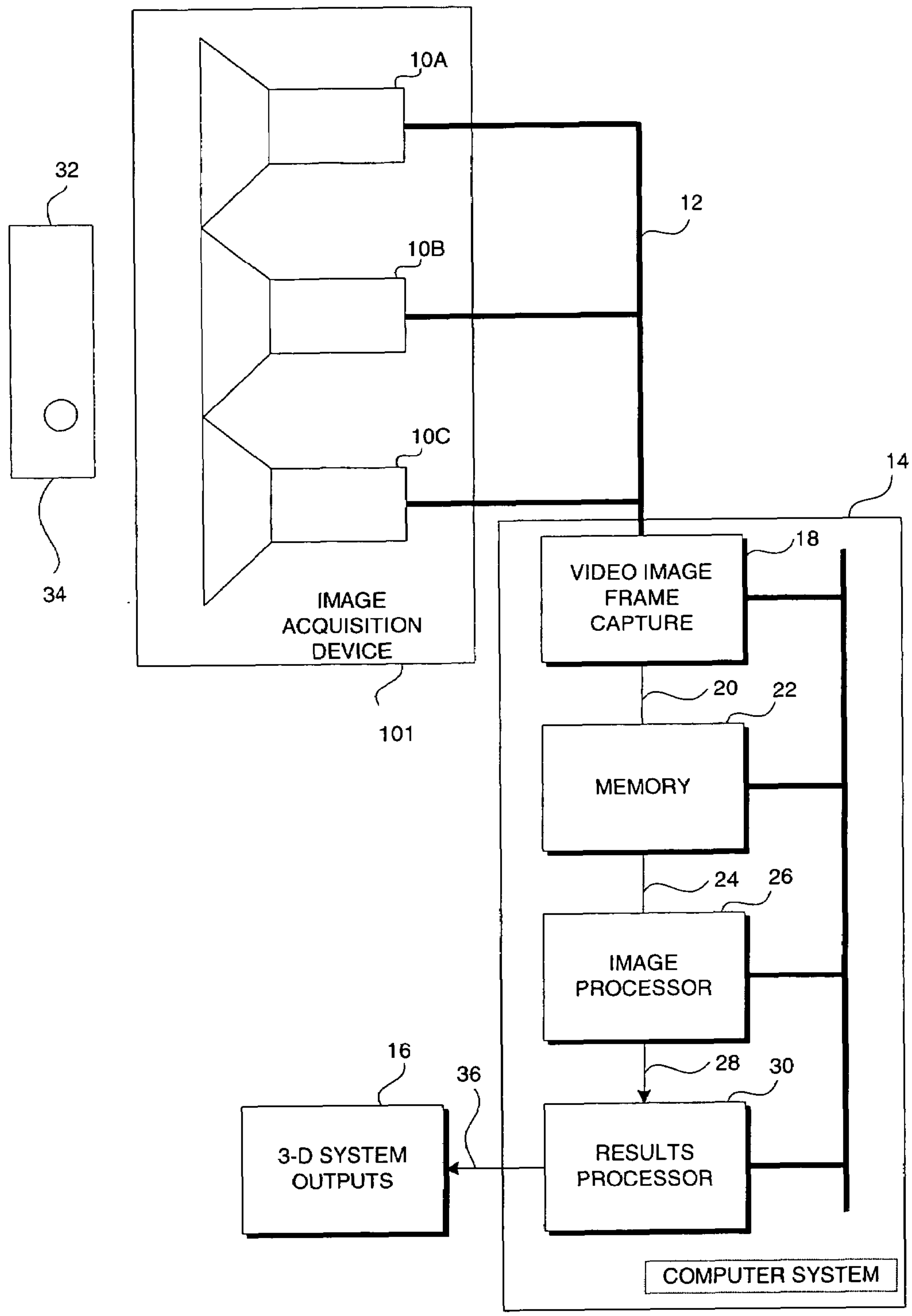
FIG. 1 is a functional block diagram of a 3-D object segmentation system, according to the invention.

A vision system implemented in an illustrative embodiment according to the invention is illustrated in FIG. 1. The system acquires an image set from at least three cameras, performs edge processing for each independent image, performs stereoscopic correspondence and matching for pairs of images, merges the sets of stereoscopic data, performs 3-D computations based upon known camera geometry to determine 3-D features, and then clusters 3-D points into distinct objects.

The illustrative embodiment incorporates an image acquisition device 101, comprising at least three cameras 10*a*, 10*b*, 10*c* such as the Triclops model available from Point Grey Research, Vancouver B.C. The cameras 10 send a video signal via signal cables 12 to a video processor 14. The three cameras are each focused on a scene 32 to be processed for objects. The video processor 14 includes a video image frame capture device 18, image processor 26, and results processor 30; all of which are connected to a memory device 22. Generally, digitized video image sets 20 from the video image capture device 18, such as a 8100 Multichannel Frame Grabber available from Cognex Corp, Natick, Mass., or other similar device, are stored into the memory device 22. The image processor 26, implemented in this illustrative embodiment on a general-purpose computer, receives the stored, digitized, video image sets 24 and generates 3-D object data 28. The 3-D data 28 is delivered to the results processor 30 which generates results data dependent upon the application, and may indicate for example that the object has come too close to the camera-carrying device.

The image acquisition device 101 in the illustrative embodiment comprises an arrangement, as illustrated in FIG. 2, for acquiring image information. In the illustrative arrangement, three cameras: a right camera 222, a left camera 224, and a top camera 226 are mounted on an L-shaped support 220, with two of the cameras, the left camera 222 and the right camera 224 side-by-side, forming a line, and the third, top camera 226 mounted out of line with the other two 222, 224.

Figure 3:
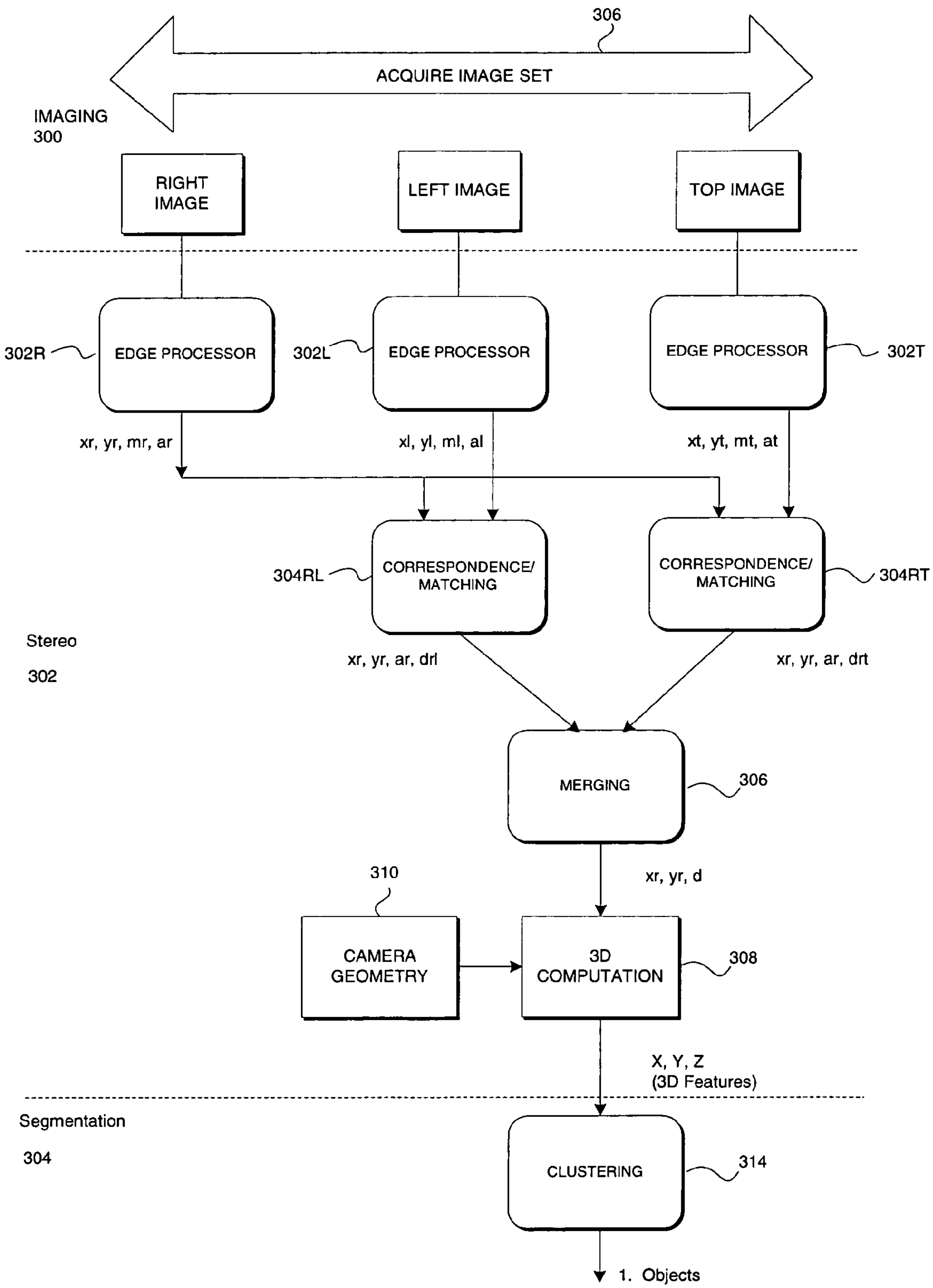
FIG. 3 is a flow diagram illustrating the processing of video images according to the invention.

FIG. 3 provides an overview of operation according to the invention. Referring now to FIG. 3, in a first step 300, a plurality of video image signals are captured in a way that the image from each camera 222, 224, 226 is captured at substantially the same instant. This synchronization can be accomplished by having the video image frame capture device 18 send a timing or synchronization signal to each camera 222, 224, 226, or one camera may act as a master and generate a timing or synchronization signal to the others. The video signals from the image acquisition device 101 are digitized by the video image frame capture device 18, and stored into the memory device 22 for further processing. The video image frame capture device 18 includes digitizing circuitry to capture the video image input from the image acquisition device 101 and convert it at a high resolution to produce a digital image representing the two-dimensional scanned video image as a digital data set. Each data element in the data set represents the light intensity for each corresponding picture element (pixel). The digital data set generated from each camera 222, 224, 226 is stored in memory 22.

The next step 302 is to process the independent images to detect edges. In further accord with the invention, the filtering and edge detection are performed separately for the image corresponding to each separate camera, resulting in a plurality of sets of objects (or features, used interchangeably) characterized by location, size, and angle. Furthermore, features are organized in the form of chains of connected edgelets. This process is based upon parabolic smoothing followed by a non-integral sub-sampling (at a specific granularity), Sobel Edge Detection, followed by True peak detection and finally chaining. This results in a list of connected edgelets (chains). Edges are defined by their position (xy) co-ordinate, magnitude and direction (orientation angle). Only features that belong to chains longer than a predetermined length are passed to the next stage.

The stereoscopic sets of features and chains are then pairwise processed according to the stereo correspondence problem, matching features from the right image to the left image 304RL, resulting in a set of horizontal disparities, and matching features from the right image to the top image, 304RT resulting in a set of vertical disparities.

The algorithm used here is a modified version of the algorithm presented in "A Stereo correspondence algorithm using a disparity gradient constraint" by S. B. Pollard, J. E. W. Mayhew and J. P. Frisby in Perception, 14:449-470, 1985. The modifications done are to exploit the fact that the features are connected into chains, therefore compatibility of correspondences is enforced between chain neighbors and not an arbitrary neighborhood. This is not only faster but is more meaningful and robust as the neighboring points in the chains more often than not correspond to neighboring points on the 3-D object, where the disparity gradient constraint is enforced.

With regard to the disparity gradient itself, each correspondence or match-pair consists of a point in image 1 and a point in image 2 corresponding to the same point in the object. The disparity vector is the vector between the points in the two images. The disparity gradient is defined between two points on the object or correspondences (or match-pairs) and it is the ratio of the difference between disparities to the average distance between the points in image 1 and image 2.

This disparity gradient constraint, which is an extension of the smoothness constraints and surface-continuity constraints, sets an upper limit on the allowable disparity gradients. In theory, the disparity gradient that exists between correct matches will be very small everywhere. Imposing such a limit provides a suitable balance between the twin requirements of having the power necessary to disambiguate and the ability to deal with a wide range of surfaces.

The algorithm itself works as follows. The initial set of possible matches for each feature is constrained using the epipolar constraint. The epipolar constraint means that for a given point in an image, the possible matches in image 2 lie on a line. The epipolar assumption is symmetric in the sense that for a point on image 2, the possible matches lie on a line in image 1. Therefore, the dimension of the search space has been reduced from two dimensions to one dimension. A potential match between a feature in the first image and a feature in the second image is then characterized by a initial strength of match (SOM). The SOM is calculated by comparing the magnitude and the direction of the edgelets that make up the features. The only matches considered are those which have a minimum amount of initial strength. Next, the disparity constraint is imposed. This step involves updating the SOM of each potential correspondence (match pair) by comparing it with the potential correspondences of the neighbors in the chains to which the features belong.

Next, a winner-take-all procedure is used to enforce uniqueness, which means that each point in image 1 can correspond to one, and only one, point in image 2 and vice-versa. The SOM for each match is compared to the SOMs of the other possible matches with the two features that are involved and only the strongest SOM is accepted. Then because of the uniqueness constraint, all other associated matches with the two features are eliminated from further consideration. This allows further matches to be selected as correct, provided they have the highest strength for both constituent features. So the above winner-take-all procedure is repeated for a fixed number of iterations.

Once the matches are obtained, the disparity vector can be obtained which is nothing but the vector between the two features. For a match between the right and left images, the disparity vector is predominantly horizontal, whereas for match between right and top images the disparity vector is predominantly vertical.

Further according to the invention, the multiple (i.e., horizontal and vertical) sets of results are then merged (i.e., multiplexed) 306 into a single consolidated output, according to the orientation of each identified feature and a pre-selected threshold value. In an illustrative embodiment, if the orientation of a feature is between 45 and 135 degrees or between 225 and 315 degrees, then the horizontal disparities are selected; otherwise the vertical disparities are selected. The non-selected disparities data are discarded.

Processing of the consolidated output then proceeds using factors such as the known camera geometry 310 to determine a single set of 3-D features. The merged set of 3-D features is then further processed into a set of 3-D objects through a "clustering" algorithm which determines boundaries of 3-D objects.

Once the 3-D points of the features in the image are extracted they can be segmented into distinct sets, where each set corresponds to a distinct object in the scene. In this invention, the objects are constrained to lie in a known 2-D plane such as a table, ground, floor or road surface, which is typically the case. Therefore, segmenting the objects means distinguishing objects that are separated in this plane (2D distance along the plane). This procedure uses application domain information such as the segmentation plane mentioned above and a 3-D coordinate system attached to the plane. Assuming that the surface normal of this plane is the y axis (along which height is measured), this allows the selection of an arbitrary origin, x axis (along which to measure width), and z axis (along which depth is measured).

Other information that is needed for segmentation, all of which is relative to the plane coordinate system includes:

(i) approximate range distances of the objects (z);

(ii) approximate lateral distance of the objects (x);

(iii) spacing threshold between the objects along the plane (2D distance along the xz); and (iv) approximate size, width, height, depth of the object (coordinate independent).

The first step that is performed is to convert all 3-D points to a coordinate system that is attached to the plane. Next, points are eliminated if they are too far or too close (range) or are too much to the left or right (lateral distance) and are too high (height of the object) and are too close to the plane on which they lie (xz plane). Eliminating points close to the ground plane helps remove shadows and plane-surface features. The set of all eliminated points contains points that are not given any object label.

The remaining points that do not get filtered out are then segmented into distinct object sets. Clustering is achieved by using the chain organization of the edgelets. The chains of features are broken into contiguous segments based on abrupt changes in z between successive points. This is based upon the theory that if they are contiguous in image coordinates and have similar z values then they correspond to the same object and hence the same cluster. Each of these segments now corresponds to a potentially separate cluster. Next, these clusters are merged, based on whether they overlap in x or in z. This is based upon the assumption that objects will be separated in xz. The criterion used for merging is the spacing threshold. It should be noted that, as an alternative, separate thresholds could be specified for x and z spacing.

There are several advantages of the present invention. The system provides high-accuracy edge detection, merging of disparity data from multiple views based on segment angle, chain-based segmentation; and high-speed, chain-based clustering.

Although the invention is described with respect to an identified method and apparatus for image acquisition, it should be appreciated that the invention may incorporate other data input devices, such as digital cameras, CCD cameras, video tape or laser scanning devices that provide high-resolution two-dimensional image data suitable for 3-D processing.

Similarly, it should be appreciated that the method and apparatus described herein can be implemented using specialized image processing hardware, or using general purpose processing hardware adapted for the purpose of processing data supplied by any number of image acquisition devices. Likewise, as an alternative to implementation on a general purpose computer, the processing described hereinbefore can be implemented using application specific integrated circuitry, programmable circuitry or the like.

Furthermore, although particular divisions of functions are provided among the various components identified, it should be appreciated that functions attributed to one device may be beneficially incorporated into a different or separate device. Similarly, the functional steps described herein may be modified with other suitable algorithms or processes that accomplish functions similar to those of the method and apparatus described.

Although the invention is shown and described with respect to an illustrative embodiment thereof, it should be appreciated that the foregoing and various other changes, omissions, and additions in the form and detail thereof could be implemented without changing the underlying invention.

What is claimed is:

1. A method for segmenting stereoscopic information into 3-D objects comprising the steps of:

acquiring a set of multiple images of a scene substantially simultaneously and having a predetermined geometric relationship with each other;

using a vision system to carry out the steps of:

filtering each of said acquired multiple images to obtain multiple sets of features observed in each of said corresponding multiple images;

processing at least two pairs of sets of features to generate at least two result sets according to matching features between members of each pair of sets of features; wherein the step of processing further includes the steps of: matching features from a right image and a left image to form a set of horizontal disparities; and matching features from a right image and a top image to form a set of vertical disparities, wherein said right and left images were obtained from image acquisition devices arranged along a horizontal line, and said right and top images were obtained from image acquisition devices arranged along a vertical line substantially perpendicular to said horizontal line;

selecting features from said at least two result sets according to a predetermined orientation threshold;

extracting 3-D features from said selected features;

filtering said 3-D features according to location; and clustering any remaining 3-D features into discrete 3-D objects.

2. The method of claim 1 in which said step of filtering each of said acquired multiple images further includes the steps of:

digitizing each image into a two-dimension grid of pixels, each pixel having a light intensity value;

evaluating said grid to identify areas in which said light intensity values of adjacent pixels indicate presence of an edge of an object;

processing each of said edges using parabolic smoothing, followed by a non-integral sub-sampling, Sobel edge detection, true peak detection and chaining of edgelets into edges;

characterizing each edge according to its xy location, its magnitude, and its orientation angle; and discarding any edge that has a magnitude less than a predetermined threshold.

3. The method of claim 1 in which each said step of matching further comprises the steps of:

for each feature in a first image, removing features in a second image that do not satisfy an epipolar constraint, calculating a strength of match (SOM) for each remaining feature in said second image, eliminating features from said second image whose SOM is less than a predetermined threshold, calculating a new SOM according to the SOM of neighboring features on a chain of each remaining feature in said second image, and designating the features having the strongest SOM as a match.

4. The method of claim 3 in which each said step of designating features as a match is repeated for a fixed number of iterations.

5. The method of claim 1 in which the step of selecting further comprises the steps of:

calculating a disparity vector for each feature of each of said result sets;

selecting features of a horizontal result set if said disparity vector is within a predetermined range of vertical orientation angles;

selecting features of a vertical result set if said disparity vector is outside of said predetermined range of vertical orientation angles; and discarding features of each result set that were not selected.

6. The method of claim 5 in which said predetermined range of vertical orientation angles is approximately 45 degrees to 135 degrees and approximately 225 degrees to 315 degrees.

7. The method of claim 1 in which said step of extracting is implemented by calculating a set of 3-D points corresponding to said selected features.

8. The method of claim 1 in which said step of filtering said 3D features further comprises the steps of:

converting all 3-D points of said selected features into a coordinate system related to a plane; and eliminating points that exceed application-specific thresholds for relative range, lateral offset, and distance from said plane;

whereby points that do not correspond to objects of interest are eliminated from further segmentation.

9. The method of claim 1 in which said step of clustering further comprises the steps of:

organizing chains of features according to changes in a range dimension between successive points on a chain;

merging said chains according to their overlap; and identifying separated objects as a function of distance exceeding a predetermined threshold.

10. A method for segmenting stereoscopic information into 3-D objects comprising the steps of:

acquiring a left image, a right image and a top image of a scene, using a trinocular image acquisition device;

using a vision system to carry out the steps of:

separately processing each of said left, right and top images to filter each image and to create corresponding sets of edge characteristics for each image;

stereoscopically matching features between said right and left images to create a set of vertical feature matches, each having a disparity vector;

stereoscopically matching features between said right and top images to create a set of horizontal feature matches, each having a disparity vector;

selecting all features from the set of vertical feature matches having a disparity that is substantially vertical and discarding corresponding features from the set of horizontal matches, to obtain a combined set of selected vertical features and horizontal features;

extracting a set of 3-D features from said combined set of features, based upon predetermined camera geometry;

filtering said set of 3-D features to eliminate features corresponding to predetermined 3-D locations; and clustering said filtered set of 3-D features into a set of 3-D objects, according to discontinuities in a range dimension among successive 3-D points in a chain of points corresponding to a 3-D feature.

11. The method of claim 10 in which said steps of stereoscopically matching each further comprise the steps of:

for each feature in a first image, removing features in a second image that do not satisfy an epipolar constraint, calculating a strength of match (SOM) for each remaining feature in said second image, eliminating features from said second image whose SOM is less than a predetermined threshold, calculating a new SOM according to the SOM of neighboring features on a chain of each remaining feature in said second image, and designating the features having the strongest SOM as a match.

12. The method of claim 10 in which said disparity is determined to be substantially vertical if the feature being evaluated has an angular orientation that is more than 45 degrees from horizontal.

13. The method of claim 10 in which said step of filtering further comprises the steps of:

converting all 3-D points of said extracted 3-D features into a coordinate system related to a horizontal plane; and eliminating 3-D points that exceed application-specific thresholds for relative range from said trinocular image acquisition device, lateral offset, and height above said horizontal plane, including elimination of 3-D points less than a predetermined height above said plane;

whereby 3-D points that do not correspond to objects of interest, and 3-D points corresponding to shadows on said plane, are eliminated from further segmentation.

* * * * *